May 4, 1926.                 F. MURPHY                 1,583,731
RESILIENT SUSPENSION MEANS FOR AUTOMOBILES AND LIKE ROAD VEHICLES
Filed Feb. 19, 1925
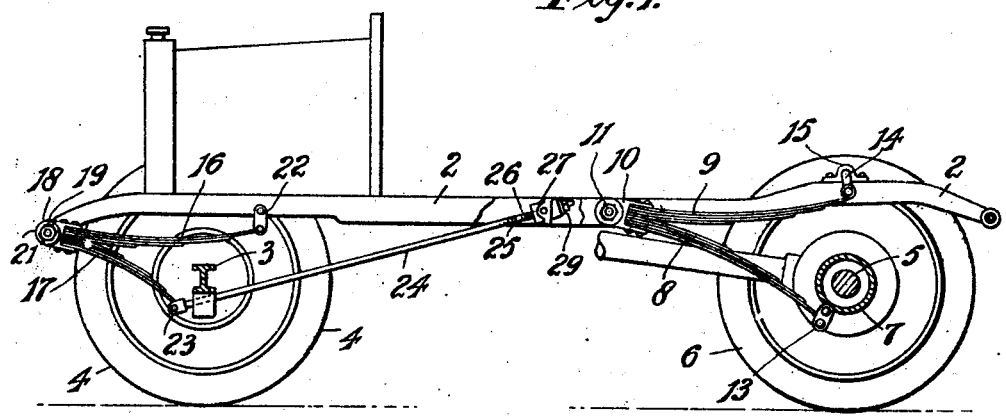
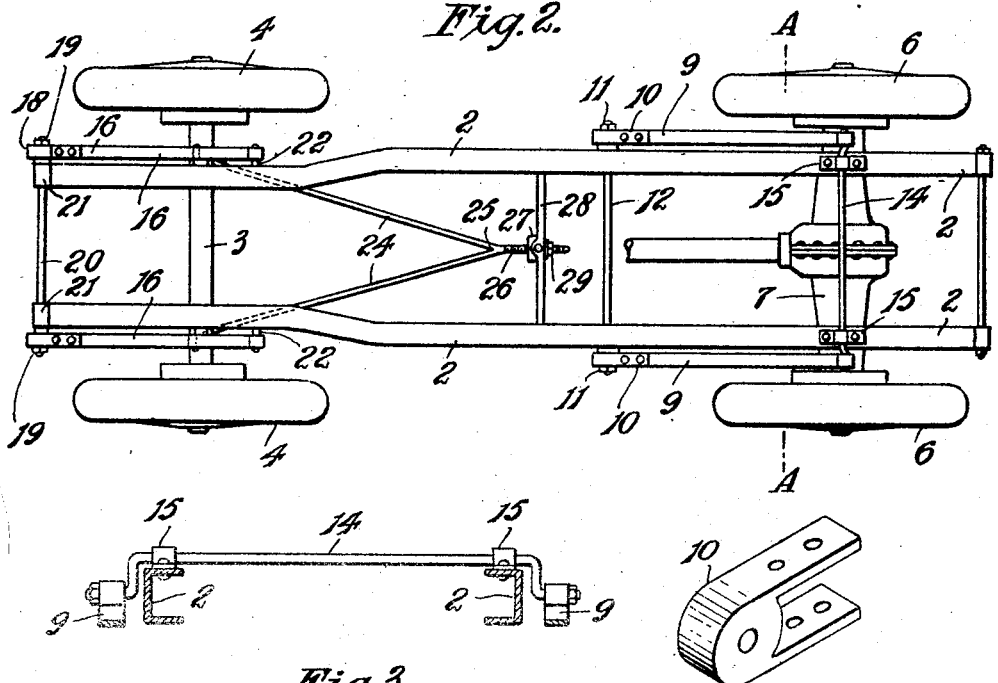
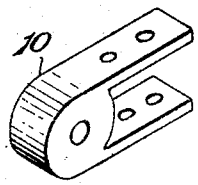
Inventor:
Francis Murphy Patented May 4, 1926.

1,583,731

UNITED STATES PATENT OFFICE.

FRANCIS MURPHY, OF MURRUMBURRAH, NEW SOUTH WALES, AUSTRALIA.

RESILIENT SUSPENSION MEANS FOR AUTOMOBILES AND LIKE ROAD VEHICLES.

Application filed February 19, 1925. Serial No. 10,358.

*To all whom it may concern:*

Be it known that I, FRANCIS MURPHY, a subject of the King of Great Britain, residing at Murrumburrah, in the State of New South Wales, Commonwealth of Australia, have invented new and useful Improvements in Resilient Suspension Means for Automobiles and like Road Vehicles, of which the following is a specification.

This invention relates to improvements in resilient suspension means for the bodies of automobiles and like motor-propelled road vehicles, and it has been devised to provide a resilient suspension, which will be very effective in absorbing road shocks imparted to the vehicle wheels and in obviating the imposition of undue stresses on the transmission mechanism, while permitting the springs to have the required freedom of action.

The improved resilient suspension is characterized by being so constructed and arranged that road shocks imparted to one of the vehicle wheels are distributed so that they become absorbed by the action of resilient units of oppositely disposed wheels, and in such manner that lateral sway of the automobile body is considerably decreased.

Reference is made to the accompanying drawings, wherein:—

Figure 1 is a view in sectional elevation illustrating an automobile chassis equipped with resilient suspension means according to the invention.

Figure 2 is a view in plan of Figure 1.

Figure 3 is a cross-sectional view, on enlarged scale, on line A—A in Figure 2.

Figure 4 is a detail view of a device for clamping the ends of two springs and for securing the same to the chassis.

In these views, 2 indicates the automobile chassis, 3 the front axle, 4 the forward road wheels, 5 the rear axle, 6 the rear road wheels, and 7 the housing of the rear axle.

At each end of the rear axle I provide a resilient suspension device comprising two laminated springs 8 and 9, which are slightly curved in opposite directions and rigidly fastened together at their forward ends within a jaw that is formed in a clamp member 10.

The clamp members of the two spring units, disposed one at each side of the vehicle, are secured by nuts 11 on the screw-threaded ends of a transverse connecting rod 12 rigidly bolted to the chassis, and lateral movement of said spring units is thus prevented.

The rear ends of the lower springs 8 are pivotally secured by shackles 13 to the rear axle housing 7 at points below the rear axle 5, while the upper springs 9 have their rear ends affixed to the ends of a crank-rod 14. This crank-rod is journaled in brackets 15 mounted on the chassis and it extends transversely of the vehicle above the rear axle.

When a road shock is imparted to either of the rear road wheels, the relative springs are compressed and cause partial rotation of said crank-rod 14 and a compression of the springs of the opposite road wheel. Consequently, the road shocks which are evenly distributed by the said crank-rod between the two sets of springs, are effectively absorbed and side sway of the automobile body under road traveling conditions is minimized.

At the opposite ends of the front axle 3 are resilient suspension devices, each of which comprises two laminated springs 16 and 17 curved similarly to the rear springs 8 and 9 and fastened together at their forward ends in the jaw of a clamping member 18. The clamps of the two forward spring units are secured by nuts 19 on the ends of a transverse connecting rod 20, which passes through bosses 21 provided on the chassis, and said forward spring units are thus restrained against lateral movement.

The upper springs 16, which are of greater length than the lower springs 17 are disposed above the front axle 3 and their rear ends are pivotally secured by means of shackles 22 to the chassis at points rearwardly of said axle 3.

The rear ends of the lower springs 17 are pivotally fastened to brackets 23 that are fitted to the extremities of diagonal rods 24 secured to the front axle 3 of the vehicle. These diagonal rods extend rearwardly as is shown in Figure 2, and they are united at 25 to a screw-threaded rod 26, which passes through a swivel block 27 mounted on a cross-bar 28, that is rigidly secured to the chassis.

The screw-threaded rod 26 is provided with an adjustment nut 29 to permit the diagonal rods 24 being drawn rearwardly and locked in adjusted position, whereby the tension of the forward spring units can be regulated as may be required. Rebound shock of the springs 16 and 17 can be prevented by the means described as said springs cannot expand beyond the degree to which regulated by adjustment of the nut 29 although they can be compressed to a degree that they will abut, thus affording requisite resiliency.

One representative form of the invention has been herein described and is illustrated in the drawings, but I am aware that in adapting the improved resilient suspension means to different types of automobiles alterations in constructional details as also in design and arrangement will be necessary. Any such alterations or modifications are deemed to be within the ambit of the invention as defined by the following claiming clauses.

What I do claim is:—

1. In an automobile or like road vehicle, the combination with the chassis and the rear axle, of two spring units, one at each side of the chassis, means securing said spring units at one end to the chassis, connections between said spring units and the rear axle, and a rod extending transversely of the chassis and provided at opposite ends with cranks which are connected to the adjacent ends of said spring units.

2. In an automobile or like road vehicle, the combination with the chassis and the rear axle, of two spring units, one at each side of the chassis, pivotal connections between said spring units and the rear axle, a member secured transversely to the chassis and connecting said spring units at one end, and a rod extending transversely of the chassis and provided at opposite ends with cranks which are connected to the adjacent ends of said spring units.

3. In an automobile or like road vehicle, the combination with the chassis and the rear axle, of two spring units, one at each side of the chassis and comprising two laminated springs in substantially V-arrangement, clamps fastening the forward ends of said springs, a transverse rod connecting opposite clamps and secured to the chassis, a rod mounted transversely on the chassis and provided at opposite ends with cranks which are connected to the two upper opposite springs, and pivotal connections between the two lower opposite springs and the rear axle.

In testimony whereof I affix my signature.

FRANCIS MURPHY.